Figure 2:
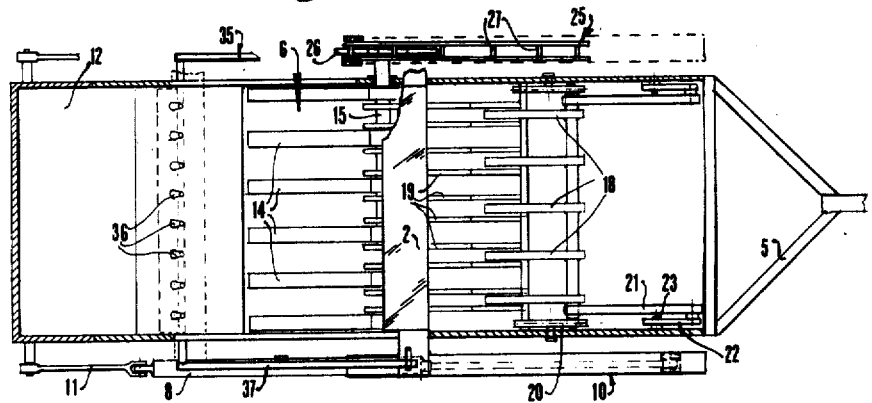

United States Patent [19]

Oosterling et al.

[11] 4,375,786
[45] Mar. 8, 1983

[54] DEVICE FOR BALING CROP

[75] Inventors: Pieter A. Oosterling, Nieuw-Vennep; Adriaan Van Zweeden, Rijsenhout, both of Netherlands

[73] Assignee: Expert N.V., Willemstad, Netherlands Antilles

[21] Appl. No.: 204,865

[22] Filed: Nov. 7, 1980

Related U.S. Application Data

[63] Continuation of Ser. No. 940,670, Sep. 8, 1978, abandoned.

[30] Foreign Application Priority Data

Sep. 9, 1977 [NL] Netherlands .................. 7709962
Jul. 20, 1978 [NL] Netherlands .................. 7807779

[51] Int. Cl.³ ........................... B30B 1/06; B30B 7/04
[52] U.S. Cl. .................................. 100/189; 100/142; 56/341
[58] Field of Search ................ 100/26, 50, 142, 187, 100/188, 189, 200; 56/341–344

[56] References Cited

U.S. PATENT DOCUMENTS

| 4,034,543 | 7/1977 | Voth et al. | 56/341 |
| 4,118,918 | 10/1978 | White | 56/341 |
| 4,135,444 | 1/1979 | White et al. | 100/50 |

Primary Examiner—Peter Feldman
Attorney, Agent, or Firm—Diller, Ramik & Wight

[57] ABSTRACT

A device for baling crop comprising a baling chamber having an inlet port and a ram adapted to reciprocate along said port and an auxiliary space joining the inlet port outside the baling chamber for temporarily storing crop to be compressed, said device is provided with a blocking member for predensifying the crop as well as compressing means for compressing the crop in a transverse direction in said auxiliary space, the blocking member is driven by means of a cam/cam wheel mechanism actuated by said ram, while said device furthermore comprises retaining members in said baling chamber to prevent rebounding of crop material already compressed and/or to retain crop in said baling chamber if said chamber is opened during the discharge of a bale.

17 Claims, 6 Drawing Figures

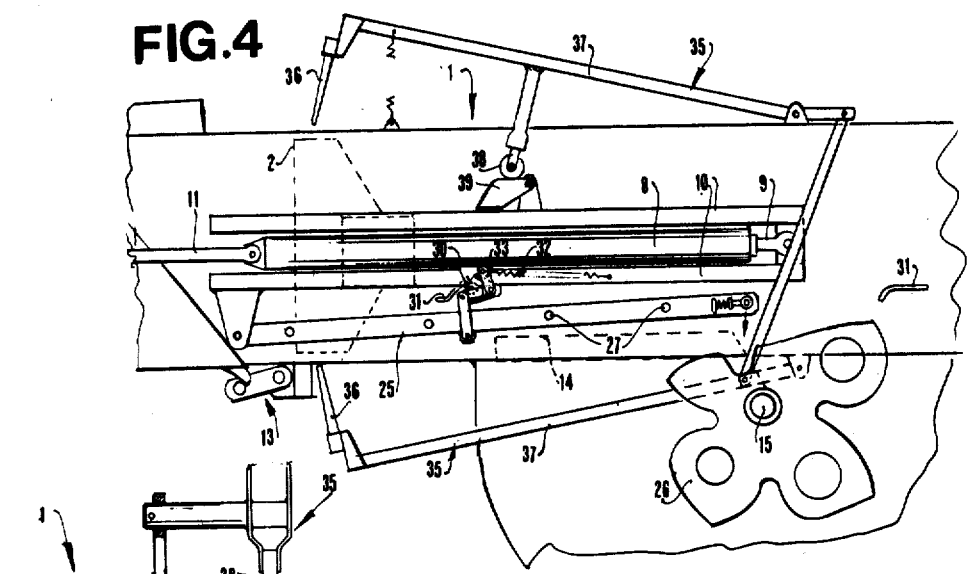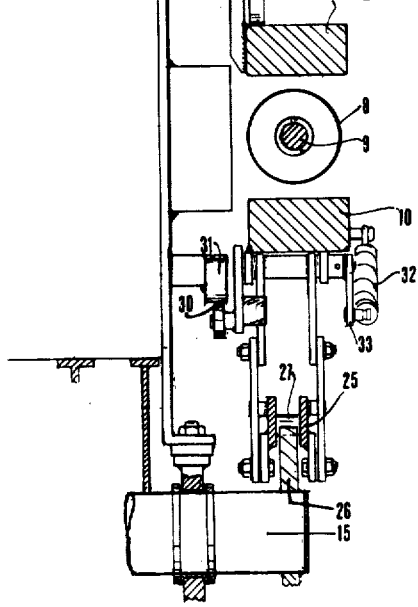

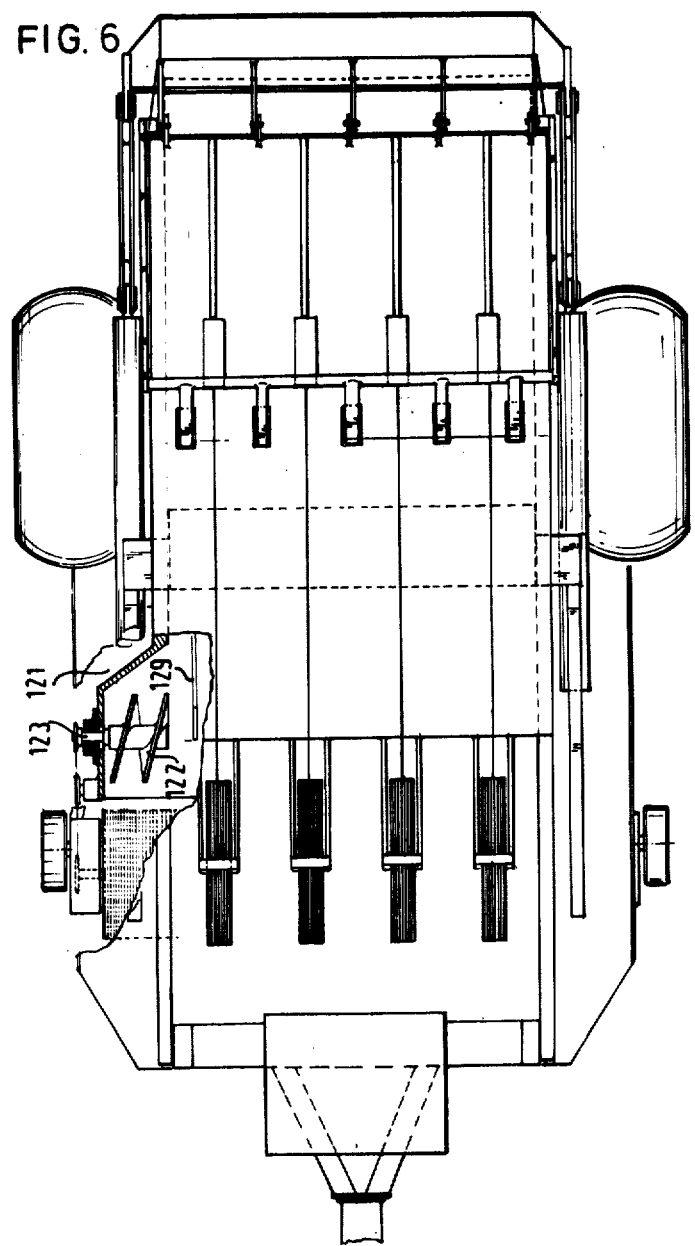

DEVICE FOR BALING CROP

This is a continuation, of application Ser. No. 940,670 filed Sept. 8, 1978, now abandoned.

The invention relates to a device for baling crop comprising a baling chamber having an inlet port and a ran adapted to reciprocate along said port and an auxiliary space joining the inlet port outside the baling chamber for temporalily storing crop to be compressed.

The invention has for its object to more fully utilize the auziliary space of the device set forth and thus to reduce the cycle time for the formation of a bale so that the device can be used with improved economic success. This device is distinguished in that at least one member is provided for blocking the passage of the auxiliary space and for being each time in order to produce a preliminary densification of the crop introduced into the auxiliary space. Since thus the passage of the auxiliary space is temporarily blocked, the crop by being continuously fed can be preliminary densified to a given extent, which is advantageous subsequently in the compression cycle proper.

The invention furthermore suggests to construct the blocking member at the same time as a conveyor so that the quantity of predensified crop can be introduced by the blocking member through the inlet port into the compression space.

In a preferred embodiment the blocking member is constructed in the form of a flap-shaped element which is preferably rotatable through 360°, which provides the advantage that the auxiliary space can be utilized to the optimum, since no space need be economized for a reciprocating flap portion.

Owing to said rotary movement the quantity of predensified crop is each time swept from the auxiliary space into the compression space.

The invention furthermore proposes to design the transmission mechanism in the form of a row of cams connected with the ram and of a cam wheel cooperating herewith and being secured to the shaft.

In a preferred embodiment the cam wheel has recesses for receiving a cam and being located at unequal distances from the rotary axis. With a uniform movement of the ram this results in that with appropriate dimensioning the flap portion is turned in an accelerated manner along the first port of its path, where no function has to be fulfilled, whereas along the last part of the path the movement is slowed down whilst a higher pressing force can be exerted on the crop. Thus the conveying effect of the flap portion is improved and, in addition the pre-densification of the crop before it is baled by the ram is enhanced.

The invention furthermore relates to an embodiment in which the conveying member is driven by the compressing member through a toothed rack/toothed wheel mechanism rotatably about an axis transverse of the direction of movement of said member, whilst the compression chamber has an outlet opening that can be closed. With such a device it is desirable to block the compressing member each time when the outlet port is opened in order to prevent the expulsion of crop located in the compression chamber when the outlet port of the compression chamber is open.

An object of the invention is to provide a simple method of blocking. The device is distinguished in that at least one blocking member can be inserted between the teeth of the toothed rack/toothed wheel mechanism in order to fix the mechanism in place and thus to block the compressing member.

The device set forth above is particularly intended for making bales having a comparatively high specific weight, which implies that the crop introduced into the device has to be densified to a high extent. However, crop does not behave like fluid and therefore the density of the compressed bale is not homogeneous at all places. Particularly the outer sides of a bale usually exhibit a lower density than the interior of the bale.

The invention has for its object to obviate this disadvantage and provides a device which is distinguished in that the inlet opening of the auxiliary space has a larger circumference than the inlet opening of the compression chamber, whilst the auxiliary space comprises means for compressing crop in a direction transverse of the passage of the auxiliary space.

Owing to these pressing means in the auxiliary space a slight preliminary densification can already be obtained on the outer side of the flow of crop through the auxiliary space towards the compression chamber so that a homogeneous density throughout the resultant bale is ensured.

In a preferred embodiment in which the auxiliary space is equipped with two parallel walls, between which one or more conveying members can operate, said walls are flaring towards the inlet opening in a stepwise manner, each step having pressing means.

If the device is constructed so that the ram has to perform a number of strokes before the full quantity of crop required for a bale is compressed, a plurality of retaining members introducible into the compression space is arranged in accordance with the invention near the end position of the ram, which members retain the once introduced crop at each return stroke of the ram.

In a preferred embodiment the retaining members are constructed in the form of a row of tines, each of which can be passed through an associated hole in the baling chamber wall, said rows being arranged on an auxiliary frame of the device adapted to turn with respect to the main frame, the swinging movement being derived from the reciprocatory movement of the ram. This construction provides the possibility of adjusting the cycle of the machine so that new crop may be fed and retained by the retaining members while the preceding bale is still present in the compression space.

According to another embodiment of the invention, said retainers being secured to a carrier adapted to pivot relatively to the compression chamber are controlled by a pivotable wall portion of the compression chamber, by means of which the outlet port can be closed. For this purpose the pivotal movement of the wall portion is coupled with the pivotal movement of the carrier in a manner such that, when the wall portion is opened, the retainers are inserted into the compression chamber.

The invention will be described more fully with reference to a few embodiments illustrated in the accompanying drawings.

Figure 1:
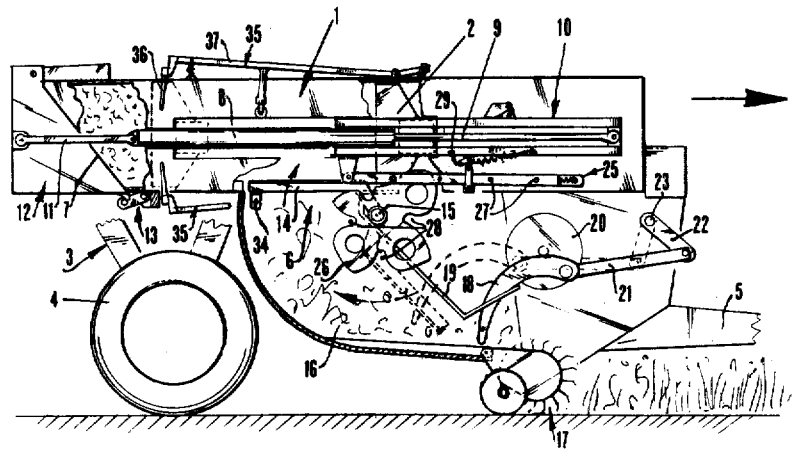
Figure 5:
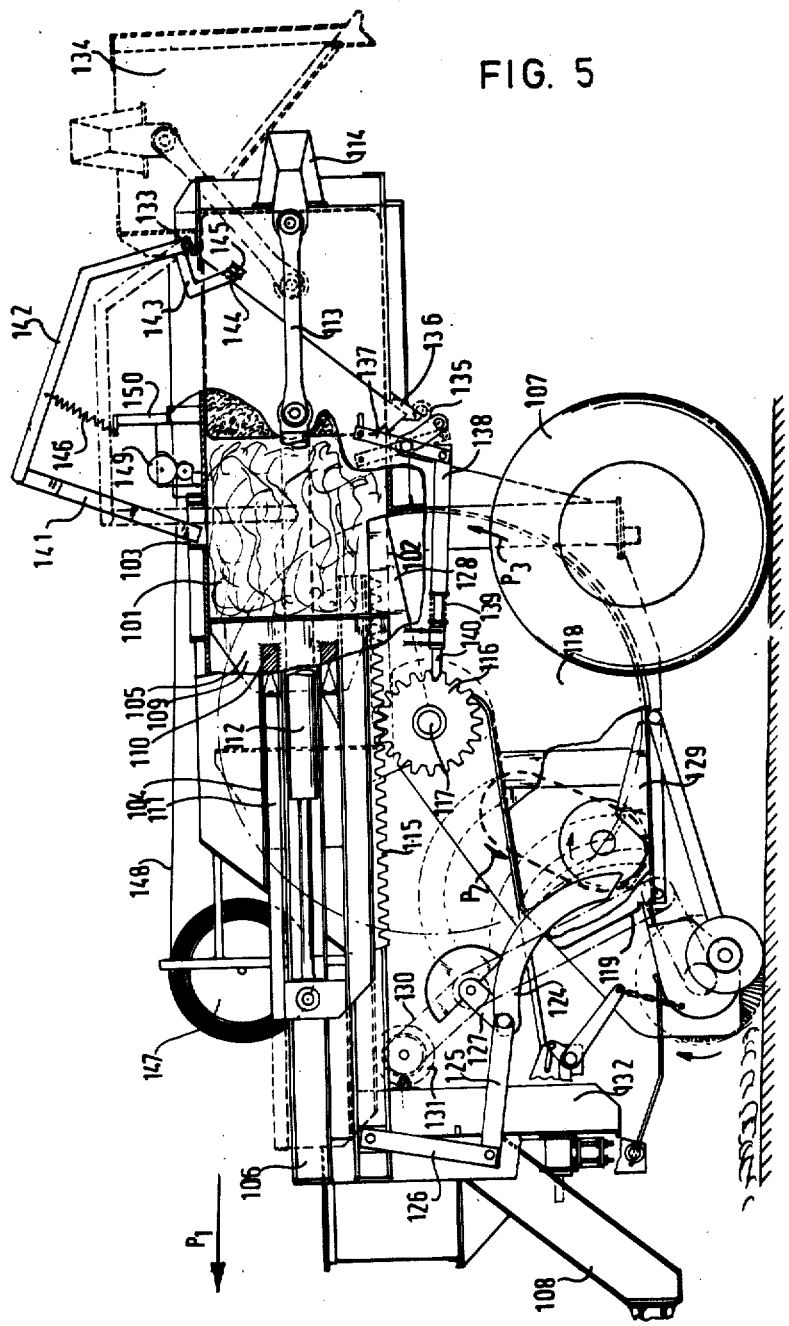

FIG. 1 is a longitudinal sectional view of an embodiment of a baling device in accordance with the invention, FIG. 2 is a plan view of the device of FIG. 1, FIG. 3 is a sectional view taken on the line III—III in FIG. 1, FIG. 4 is a side elevation of the component parts of the actuating mechanism shown in FIG. 3, FIG. 5 is a vertical longitudinal sectional view of another embodiment of the baling device in accordance with the invention, FIG. 6 is a plan view of the device shown in FIG. 5.

The baling device shown in the figures comprises essentially a horizontal baling chamber 1, in which a ram 2 is adapted to reciprocate. The baling chamber 1 is carried by a frame 3 having a ground wheel 4 and a drawbar 5 by which the device can be attached to a tractor or the like. The device is run in the direction of the arrow P1 across the field by the tractor.

The ram 2 is movable along an inlet port 6 up to a delivery port 7, for which purpose the ram 2 is equipped with a driving mechanism arranged on either side and outside the baling chamber 1.

The driving mechanism comprises a hydraulic cylinder 8, the free end of the piston rod 9 of which is connected with a pressure body 10 connected with the ram 2.

The pressure body 10 comprises two hollow beams extending on either side of the cylinder 8 and being fastened at the ram 2 to ears secured to the latter. The ears of the ram 2 extend through slots in the sidewall of the baling chamber.

The end of the cylinder 8 remote from the piston rod 9 is connected through a coupling rod 11 with a pivotal point of the upwardly pivotable rear wall 12 of the baling chamber 1. The rear wall 12 can be locked by means of lock bolts 13 in the closed or pressing state.

The inlet port 6 can be closed by a flap portion 14. The flap portion 14 can turn through 360° about a shaft 15, which is parallel to the plane going through the inlet port 6.

With the inlet port 6 communicates an auxiliary space 16, which is located in this embodiment on the bottom side of the baling chamber 1. The entry of the auxiliary space 16 is located on the right-hand bottom side in FIG. 1 and is equipped with a pickup apparatus 17, which picks up the crop from the field and passes it into the auxiliary space 16. Pushing members 18 extending through a grid-shaped top wall 19 of the auxiliary space 16 push the crop further into the auxiliary space 16. The pushing members 18 are rotatably mounted on a rotatable disc 20, which may be driven by any suitable means and the pushing members 18 are controlled by an arm 21 rigidly secured thereto and being adapted to turn about a stub shaft 23 through a rocking arm 22. Owing to the turn of the disc 20 the pushing member 18 will describe by its free end an elliptic path so that the lower end will move substantially horizontally to the left in FIG. 1, will subsequently retract itself through the grating of the top wall 19 and will again penetrate into the inlet port of the auxiliary space 16 during the return movement.

In the embodiment shown the rotary movement of the flap portion 14, which repeatedly closes the inlet port 6 of the baling chamber 1, is obtained by means of a transmission mechanism 24, which utilizes the reciprocatory movement of the ram 2.

The transmission mechanism 24 comprises a cam rod 25 pivotally mounted on the lowermost hollow beam of the pressure body and being adapted to co-operate with a cam wheel 26 rigidly secured to the shaft 15 (see also FIGS. 3 and 4).

The cam rod 25 has the shape of two parallel plates having the cams 27 mounted between them. Each cam 27 co-operates with a recess 28 of the cam wheel 26 receiving said cam. The cam rod is coupled at a distance from its pivotal joint with a shear system 29, which is controlled by a cam wheel 30, which actuates the limbs of the shear 29 by means of a rocker 40 and co-operates with a cam rack 31 rigidly secured to the baling chamber 1. A spring 32 engaging at one end the free end of a rocker arm 33 secured to the shear 29 and at the other end a fixed point of the ram 10 ensures locking of the shear system 29 in one of its extreme positions (see FIG. 4).

The shear system 29 serves to lift the cam rod 25 at the compression stroke of the ram 2 so that the cams 27 of the rod 25 cannot come into contact with the cam wheel 26. Conversely, during the return movement of the ram 2 the cam rod 25 will be lowered so that each cam 27 snaps in its associated recess 28 of the cam wheel 26. During said return movement the cam wheel 26 will be turned about the shaft 15 so that the flap portion 14 rigidly secured to the shaft 15 can perform a revolution of 360°, that is to say, partly through the compression space 8 behind the ram 2 and subsequently through the top wall grating 19 of the auxiliary space 16, after which the crop is advanced by the flap portion 14 into the compression space 1. The movement of the ram 2 with respect to the flap portion 14 is synchronized so that the crop gets in front of the ram 2 in the compression space 1.

According to a particular feature of the invention the recesses 28 of the cam wheel 26 are located at different distances from the rotary axis 15 in a progressive order. This results in that initially the rotary movement of the flap portion 14 is particularly rapid, whereas after the top wall grating 19 of the auxiliary space 16 has been traversed the rotary movement of the flap portion 14 takes place more slowly, however, with an increase in pressing moment on the crop. Therefore, the crop emerging from the auxiliary space 16 is at the same time densified by the flap portion 14.

In the meantime, in the extreme retreat of the ram 2, the shear mechanism 29 has become operative so that the cam rod 25 is lifted out of the cam wheel 26, after which a compression stroke can be performed. At the termination of the compression stroke the cam rod 25 again snaps into the recesses of the cam wheel 26 so that the cycle can be repeated.

In order to prevent the flap portion 14 from falling back into the auxiliary space 16 during the elevation of the cam rack 25, a pawl mechanism 34 is provided.

In order to prevent the crop from rebounding during the return stroke of the ram 2, retaining members 35 can be passed through the top as well as the bottom wall of the baling chamber 1.

The retaining members are formed by tines 36 arranged in rows mounted on an auxiliary frame 37, which is pivotable with respect to the baling chamber 1. The auxiliary frame 37 is provided with a supporting wheel 38 rolling along the upper hollow profile of the pressing member of the ram 2, said wheel co-operating with a cam 39 provided on said hollow profile. The position of the cam 39 with respect to the ram 2 is such that upon approach the retaining forks 36 are lifted before the ram 2 occupies its position indicated by broken lines in FIG. 1.

This construction furthermore permits of feeding crop even when a previously compressed bale is still present in the compression space near the delivery port 7. The drive of the ram 2 is stopped just in front of the retaining members 36 so that the crop is retained between said retaining members and the front side of the ram 2 and separated from the previously compressed bale.

After the compressed bales are removed from the baling chamber, the pressing member is conveyed on from its stop position to its extreme position. Upon the subsequent compression stroke the ram 2 will perform its full stroke so that the partial quantity of crop previously supplied can advance to the terminal wall 12 as soon as the latter has released the previously compressed bales. The release can take place by disengaging the bolts 13 and by temporarily locking the ram 2 in the above mentioned position so that the cylinder 8 can turn the end wall 12 of the compression space 1 in upward direction.

The baling device shown in the FIGS. 5 and 6 mainly comprises a horizontal compression chamber 101 of rectangular cross-section. The compression chamber is closed on all sides with the exception of an inlet port 102 in its bottom wall, of holes 103 in the upper wall for the retainers to be described hereinafter and of longitudinal slots 104 in the sidewall to allow driving of the ram 105 in a reciprocatory movement in the compression chamber.

The compression chamber 101 is supported by a mobile frame 106 to be drawn on ground wheels 107 in the direction of the arrow P1 (FIG. 1) across a field, the front side of the device being held by means of a drawbar 108 on a tracfor.

The ram 105 has a substantially flat front side which is reinforced by means of stiffening plates 109, to which are welded plates 110 extending horizontally through the slots 104 of the compression chamber 101. The plates 110 on both sides of the compression chamber 101 are each driven by a pressing body 111 formed by two horizontal, parallel beams provided with a tie member with a pivotal joint at the end remote from the ram 105. Said pivotal joint is linked to the piston rod of a cylinder 112 arranged between the parallel beams of the pressing body, the other end of said rod being connected through a coupling piece 113 with the closed rear wall of the compression chamber 101. For this purpose the rear wall of the compression chamber is reinforced by means of a beam 114.

On the lower side of the lowermost beam of the pressing body 111 there is provided a toothed rack 115 which co-operates with a toothed wheel 116. The toothed wheel 116 is rotatable about an axis 117 extending transversely of the reciprocatory movement of the ram 105, said axis being located beneath the lower wall of the compression chamber 101.

Between the toothed wheel 116 and the shaft 117 an overrunning clutch (not shown) is arranged so that upon a left-hand movement of the ram 105 as seen in FIG. 1 a positive connection is established between the toothed wheel 116 and the shaft 117, whereas upon a right-band movement of the ram 105 the toothed wheel 116 can rotate freely about the shaft 117.

On the bottom side of the compression chamber 101 the inlet port communicates with an auxiliary space 118, whose upper and bottom walls have the shape of segments of a circle (see FIG. 5), whereas the flat sidewalls are parallel to one another (see FIG. 6). At the front of the auxiliary space 118 an inlet port 119 is provided, in front of which pick-up apparatus 120 is arranged for picking up the crop from the field and passing it on to the auxiliary space 118. In the direction towards the inlet port 119 the upper and lower walls of the auxiliary space 118 are slightly diverging, whilst the parallel sidewalls are flaring in the direction towards the inlet port 119, which is indicated in FIG. 2 at 121. There is shown a step-shaped widening of the sidewall, where a worm conveyor 122 is provided, which is driven about an axis 123 so that an inwardly directed conveying or pressing effect respectively is obtained.

Between the parallel sidewalls, inside the auxiliary space 118 conveying means are arranged consisting on the one hand of advancing members 124 formed by a plurality of parallel, curved tines disposed side by side, the ends of which trace a curved path (see arrow P2). This movement is obtained by actuating the curved tines by means of a lever 125 fastened thereto and pivoted to the free end of a swinging arm 126 and of a continuously rotating crank mechanism 127. On the other hand the conveying means in the auxiliary space 118 comprise a grid-shaped flap portion 128, fastened to the shaft 117 and turned in the direction of the arrow P3 about the shaft 117. In order to allow both the curved thines 124 and the grid-shaped flap portion 128 to pass across the upper wall of the auxiliary space 118, this upper wall is also formed by a grating.

The bottom wall of the auxiliary space 118 is provided with a threshold formed by standing plates 129 which serves to allow the grating 128 to take over without disturbance the crop advanced by the tines 124.

The pick-up apparatus 120, the conveying worms 122 and the crank 127 of the conveying fork 124 are driven by means of a chain transmission which is coupled through a rectangular gear wheel transmission 131 with the main driving casing 132.

On the rear side, that is to say opposite the ram 105 the comprising chamber 101 is provided with an end portion 134 adapted to turn upwards about a line 133. In the closed state, that is to say, in the state indicated by solid lines in FIG. 5, the end portion is retained in the closed state by means of lock bolts 135, which snap around lugs 136 fastened to the end portion 134. By turning the lock bolts in clockwise direction with the aid of a lever 137 and an actuating mechanism (not shown) the end portion can be unlocked and turned up into the state indicated by broken lines in FIG. 5.

With said lever 137 is coupled a pushing rod 138, which actuates through a resiliently yielding element 139 a blocking member 140 so that this blocking member 140 formed by a pin is inserted in between the teeth of the toothed wheel 146. Thus the toothed wheel 116 is prevented to turn.

On the top side of the compression chamber 101 retainers 141 are provided which are formed by a plurality of parallel tines, each of which can be passed through a hole 103 in the top side of the compression chamber 101. The tines 141 are arranged on a pivotable carrier 142, which is freely pivotable about the line 133. The carrier 142 has fastened to it on one or on both sides of the compression chamber a lever 143, the stop surface 144 of which co-operates with a lug 145 on the side of the upwardly pivotable end portion 134. At a distance from the axis 133 and the retainers 141 a stop is provided on top of the compression chamber for limiting the pivotal movement of the carrier 142 in anticlockwise direction. A tensile spring 146 is arranged between said stop 150 and the carrier 142.

For completeness sake it should be noted that on top of the frame 106, at the front, reels 147 are mounted for holding a string formed by a wire 148. This wire is withdrawn from the reels by means of a transport mechanism 149, which advances the wire 148 around the bale formed, the wire being subsequently fastened by a knotting mechanism (not shown).

The device operates as follows. By means of a tractor of any kind the device is run in the direction of the arrow P1 across a field, from which mown crop is lifted by the pick-up apparatus 120 and fed to the inlet port 119 of the auxiliary space 118. The advance forks 124 push the crop to the right into the auxiliary space 118 until the space 118 is sufficiently filled. During the flow of crop through the auxiliary space 118 the crop fed over a large width is compressed to a small width in the stepped portion of the sidewall of the auxiliary space 118 by means of the worm conveyors 122 (see FIG. 2). Thus the crop is compacted in the direction of width, which becomes manifest mainly along the parallel sidewalls of the auxiliary space 118.

At the return movement of the ram 105 by means of the cylinder 112 the grid-shaped flap 128 is turned in anti-clockwise direction by way of the toothed rack-toothed wheel mechanism 115,116 for pushing the crop from the auxiliary space 118 through the inlet port 102 into the compression chamber 101. The ram 105 thus moves to the left as seen in FIG. 5, whilst a positive coupling is established between the toothed wheel 116 and the shaft 117 and the flap portion 128 respectively. The blocking member 140 occupies the retracted position, since the lock bolts retain the pivotable end portion 134.

During the movement of the ram 105 to the right the flap portion 128 remains in its position whilst the crop introduced into the compression chamber 101 is advanced by the ram 105 to the right up to the end portion of the compression chamber.

The above described compression run of the ram 105 can be repeated several times until a sufficient quantity of crop is compressed in the baling device into the desired bale.

Subsequently the bale can be tied up by means of the wires 148, after which the lock bolts 135 can be disengaged. As soon as the lock bolts 135 are loosened, the blocking member 140 becomes operative and penetrates between the teeth of the wheel 116. In this embodiment the ram 105 is blocked during the left-hand movement as seen in FIG. 5. Upon energization the cylinder 112 will turn upwards the pivotable end portion 134 through the coupling rod 113, upon which the bale formed will drop out of the compression chamber by its own weight.

Upon the downward swing of the end portion 134 the stop 145 is turned in anti-clockwise direction about the axis 133 so that the carrier 142 will turn in the same direction. The retainers 141 will protrude into the compression chamber so that any crop lying in front of the ram is retained and prevented from dropping out of the compression chamber 101 together with the bale formed.

Finally by inverse energization of the cylinder 112 the flap portion 134 is closed so that the retainers 141 are pushed out of the compression chamber, since the stop 145 urges the lever 144 so that the lock bolts 135 get home again and the blocking member 140 is lifted from between the teeth of the wheel 116.

Then the cycle described above can be repeated.

It will be apparent that the invention is not limited to the embodiment described above.

The blocking member shown in these figures as a flap may alternatively be arranged beneath the inlet port of the baling chamber. A blocking member may be constructed in an embodiment as shown in the retaining members near the outlet port of the baling chamber.

Moreover the flap portion 14 is shown in the figures as a grating formed by parallel profiles so that it can traverse the top wall grating 19 of the auxiliary space 16. Other flap portions 17 may, of course, be designed, in which the rotary shaft 15 may extend in the direction of length of the baling chamber 1. More than one flap portion 14 is possible in accordance with the invention, each of which may be actuated by any suitable construction.

The worm conveyors 122 may be replaced by any other suitable advancing means. It may be imagined to use sidewalls which as a whole can turn about a, for example, vertical axis so that an inward advance of the crop is ensured.

As an alternative, the blocking member 140 may be inserted in between the teeth of the toothed rack 115.

Finally the retainers 141 may be passed into and out of the compression chamber 101 by differently constructed coupling means between the carrier 142 and the pivotable end portion 134.

What is claimed is:

1. A baling machine comprising, in combination:
    an elongate frame defining a baling chamber and including wheel means for allowing the frame to be moved over a field;
    a ram reciprocable within said baling chamber, said baling chamber having an end wall cooperable with said ram for compressing crop therebetween to form a bale, and said chamber also having an inlet port spaced from said end wall;
    drive means for moving said ram from an extended position disposed between said inlet port and said end wall, to a retracted position disposed on the opposite side of said inlet port and then returning said ram to said extended position;
    a collection chamber carried by said frame and having an inlet mouth for receiving the crop material to be baled and having a discharge port joined with said inlet port of the baling chamber;
    means for introducing windrowed crop material into said inlet mouth whereby the crop material accumulates within said collection chamber;
    flap means blocking said inlet port for normally preventing movement of accumulated crop material from said collection chamber into said baling chamber, said flap means comprising a plurality of tines and mechanism for mounting said tines on said frame for 360° rotation in which said tines sweep upwardly into the baling chamber and thereafter downwardly to pass out of the baling chamber, into said collection chamber and back to their original positions blocking said inlet port, said collection chamber being slotted to permit downward sweeping of said tines thereinto and said tines being of a length sufficient to pick up enough crop material from the collection space as to form a compressed mass of the same within said baling chamber; and
    coupling means connecting said drive means to said flap means so that said flap means is swept through its 360° rotation as said ram is moved from its extended to its retracted positions and remains thereafter in its blocking position as the ram is returned to its extended position.

2. A baling machine as defined in claim 1 wherein said drive means comprises a hydraulic piston/cylinder assembly and said coupling means comprises a rack reciprocable with said ram and a pinion journalled on said frame and engaging said rack.

3. A baling machine as defined in claim 2 including one way drive mechanism connecting said pinion with said flap means.

4. A baling machine as defined in claim 1 wherein said end wall is pivotable for discharging a bale, latch means is provided for normally preventing pivotal motion of the end wall, and locking means is provided for preventing retraction of the ram when the latch means is released whereby to pivot said end wall to bale-discharging position.

5. A device for baling a crop such as grass or the like, comprising in combination:
   a mobile frame defining a generally horizontal baling chamber having an end wall against which the crop is to be compressed and having a laterally facing inlet opening spaced from said end wall;
   a ram reciprocable within said baling chamber toward and away from said end wall and drive means for reciprocating said ram between a retracted position clearing said inlet opening and an extended position adjacent said end wall;
   an auxiliary chamber communicating with said baling chamber through said inlet opening and feeding means for continuously feeding crop into said auxiliary chamber; and
   transfer means for periodically transferring accumulated material from said auxiliary chamber to said baling chamber, said transfer means comprising at least one member rotatable about an axis transverse to the length direction of said baling chamber, said drive means being connected with said transfer means for movement of said member in synchronism with movement of said ram whereby said member sweeps material from said auxiliary chamber into said baling chamber as said ram moves toward said retracted position and thereafter temporarily resides in inlet opening-blocking position while said ram moves toward said extended position.

6. In a baling device, the combination of: a generally horizontal baling chamber having an end wall against which material is to be compressed and having a bottom inlet opening spaced from said end wall;
   an auxiliary chamber below said inlet opening and communicating with said baling chamber through said inlet opening and feed means for delivering material into said auxiliary chamber;
   transfer means for periodically sweeping material accumulated in said auxiliary chamber upwardly into said baling chamber and temporarily confining it in the latter;
   a ram reciprocable within said baling chamber toward and away from said end wall from one side of said inlet opening to the other; and
   drive means for synchronously moving said ram and said transfer means whereby said transfer means temporarily confines the material in said baling chamber as said ram is advancing across said inlet opening toward said end wall;
   said transfer means comprising at least one member rotatable through 360° about an axis transverse to the length direction of said baling chamber.

7. In a baling device as defined in claim 6 wherein said member sweeps through said baling chamber behind said ram as the latter is retracted.

8. In a baling device as defined in claim 6 wherein said member rotates through 360°, as said ram is retracted, from and to said material-supporting position thereof.

9. In a baling device, the combination of:
   a generally horizontal baling chamber having an end wall against which material is to be compressed and having an inlet opening spaced from said end wall;
   a ram reciprocable within said baling chamber between a retracted position clearing said inlet opening on that side thereof remote from said end wall and an extended position clearing said inlet opening but disposed between the inlet opening and the end wall;
   an auxiliary chamber communicating with said baling chamber through said inlet opening;
   feeding means for feeding material into said auxiliary chamber;
   transfer means for periodically sweeping accumulated material from said auxiliary chamber to said baling chamber, said transfer means including at least one member normally lying substantially in the plane of said inlet opening and rotatable about an axis transverse to the length direction of said baling chamber to sweep successively through said baling chamber and said auxiliary chamber as the member is rotated 360° from and to its normal position; and
   drive means for synchronously actuating said ram and said member such that said member remains in its normal position as the ram is moved from its retracted to its extended position and rotates through 360° as said ram is moved from its extended to its retracted position.

10. In a baling device, the combination of:
    a generally horizontal baling chamber having an end wall against which material is to be compressed and having a downwardly facing inlet opening spaced from said end wall;
    a ram reciprocable within said baling chamber between a retracted position clearing said inlet opening on that side thereof remote from said end wall and an extended position clearing said inlet opening but disposed between the inlet opening and the end wall;
    an auxiliary chamber below said baling chamber and communicating therewith through said inlet opening;
    feeding means for feeding material into said auxiliary chamber;
    transfer means for periodically sweeping accumulated material from said auxiliary chamber to said baling chamber, said transfer means including at least one member normally lying generally in the plane of said inlet opening and rotatable about an axis transverse to the length direction of said baling chamber to sweep successively through said baling chamber and said auxiliary chamber as the member is rotated 360° from and to its normal position; and
    drive means for synchronously actuating said ram and said member such that said member remains in its normal position as the ram is moved from its retracted to its extended position and rotates through 360° as said ram is moved from its extended to its retracted position;
    said auxiliary chamber including a generally horizontal bottom wall and an arcuate wall leading from said bottom wall to that side of the inlet opening closest to said end wall, said arcuate wall being substantially concentric with the axis of rotation of said member whereby a large volume of space in said auxiliary chamber is swept by said member.

11. In a baling device as defined in claim 10 wherein said auxiliary chamber includes a top wall overlying said bottom wall, said top wall having an opening to permit said member to sweep therethrough into the confines of said auxiliary chamber.

12. In a baling device as defined in claim 11 wherein said feeding means includes a plurality of rocking fingers sweeping over said bottom wall to push material toward said arcuate wall.

13. In a baling device as defined in claim 12 wherein the paths of said rocking fingers and said member overlap, said fingers and said member clearing each other in interdigitated fashion.

14. A device as claimed in claim 1 characterized in that the coupling means comprises a cam rod and a cam wheel co-operating with the former.

15. A device as claimed in claim 14 characterized in that the cam rod is connected with the ram and the cam wheel is connected with the rotary shaft of the flap.

16. A device as claimed in claim 15 characterized in that during the return stroke of the ram the cam rod is in engagement with the cam wheel, whereas during the pressing stroke of the ram the cam rod is lifted from the cam wheel.

17. A device as claimed in claim 16 characterized in that the recesses in the cam wheel adapted to receive the cams are located at different distances from the rotary shaft.

* * * * *